US007546082B2

(12) United States Patent
Chennikara et al.

(10) Patent No.: US 7,546,082 B2
(45) Date of Patent: Jun. 9, 2009

(54) APPLICATION-LAYER MULTICAST FOR MOBILE USERS IN DIVERSE NETWORKS

(75) Inventors: Jasmine Chennikara, Somerset, NJ (US); Wai Chen, Parsippany, NJ (US); Ashutosh Dutta, Bridgewater, NJ (US); Onur Altintas, Florham Park, NJ (US)

(73) Assignees: Telcordia Technologies, Inc., Piscataway, NJ (US); Toyota Motor Corporation (JP)

( * ) Notice: Subject to any disclaimer, the term of this patent is extended or adjusted under 35 U.S.C. 154(b) by 353 days.

(21) Appl. No.: 10/791,603

(22) Filed: Mar. 2, 2004

(65) Prior Publication Data
US 2005/0195774 A1    Sep. 8, 2005

(51) Int. Cl.
  *H04H 20/74* (2008.01)
  *H04M 3/42* (2006.01)
(52) U.S. Cl. ............... 455/3.01; 455/414.1; 370/312
(58) Field of Classification Search ............ 455/12.1, 455/518, 3.01, 414.1, 414.2, 450, 454, 434; 370/401, 402, 404, 338, 352, 353, 312, 310, 370/349; 709/219, 223
  See application file for complete search history.

(56) References Cited
  U.S. PATENT DOCUMENTS
  5,313,454 A * 5/1994 Bustini et al. ............ 370/231

| 5,737,333 | A | * | 4/1998 | Civanlar et al. | 370/352 |
| 6,529,477 | B1 | * | 3/2003 | Toporek et al. | 370/235 |
| 6,697,354 | B1 | * | 2/2004 | Borella et al. | 370/352 |
| 6,934,255 | B1 | * | 8/2005 | Toporek et al. | 370/235 |
| 2002/0156900 | A1 | * | 10/2002 | Marquette et al. | 709/227 |
| 2006/0072538 | A1 | * | 4/2006 | Raith | 370/349 |
| 2007/0083667 | A1 | * | 4/2007 | Cooper | 709/231 |
| 2008/0199155 | A1 | * | 8/2008 | Hagens et al. | 386/124 |

* cited by examiner

*Primary Examiner*—Sonny Trinh
(74) *Attorney, Agent, or Firm*—Philip J. Feig

(57) ABSTRACT

As multicast services become prevalent, it is important to find viable solutions for multicasting to mobile nodes. This problem is complicated by the necessity to support multicast services over existing backbone and access networks that may have varying network and/or link layer multicasting capabilities. While most work on supporting multicast services focuses on the IP layer solution, the present invention presents an application-layer approach for providing multicast services to mobile users traversing networks with diverse multicast capabilities. The present invention places multicast proxies in the backbone and access networks to support several multicast-related functions at the application layer including the creation of virtual networks for dynamically tunneling through non-multicast-capable networks.

16 Claims, 1 Drawing Sheet

APPLICATION-LAYER MULTICAST FOR MOBILE USERS IN DIVERSE NETWORKS

FIELD OF THE INVENTION

The present invention relates to multicast services for mobile customers. In particular, the present invention presents an application-layer approach for providing multicast services to mobile users traversing networks with diverse multicast capabilities.

BACKGROUND

Multicast services are increasing in popularity as service providers take advantage of multicasting solutions to efficiently distribute content to a large number of users. For example, multicasting can be used to provide streaming content such as news or video to many subscribers. Additionally, multicast services can provide location-based information such as traffic reports and advertisements tailored for users in a specific geographical area. While these applications gain performance when the underlying network supporting them have multicasting capabilities, the networks are not consistent in this capability across the entire infrastructure especially since IP multicasting is not ubiquitous to all networks. The quality of multicast services also becomes problematic in light of the wireless network environment and the maintenance of multicast sessions to users moving through various access networks.

Multicast services are currently supported by techniques, such as IP multicasting, which have been developed for wired networks and non-mobile users. For IP multicasting, joining and advertisement of multicast groups is handled through standard protocols such as Internet Group Management Protocol (IGMP). Using this technique multicast packets are generally routed along a single shared tree or multiple source-based spanning trees for efficient distribution. Optimized paths are established and maintained by multicast routing protocols such as Protocol Independent Multicast (PIM).

These general multicast techniques do not handle large numbers of distinct multicast groups that may be needed to designate location-specific multicast services. Other solutions have been proposed to address this problem, e.g. Explicit Multicast (Xcast) and Source Specific Multicast (SSM). Xcast packets include addresses of all nodes in the multicast group and is useful if the membership in each group is small. SSM defines each multicast group by a multicast address and also by a sending, or source, IP address. Thus, SSM allows content providers to support services without requiring a unique IP multicast address. These solutions can be used to support localized services whereby a single address is used to specify a location-based service while a different source may be used in each location to provide the location-based information.

To support multicasting in mobile wireless networks requires consideration of issues not relevant for wired networks. In particular, it is desirable from the wireless user's point of view to maintain multicast services from any point of attachment to the network. For example, users in cars moving through different access networks need the capability to continuously receive multicast streams and location-specific information.

Research relevant to support multicasting for mobile nodes has been done specifically for Mobile IP. Mobile IP is a standard protocol that uses the Internet Protocol (IP) to provide user mobility, transparency to applications and higher level protocols. Mobility of a user is defined by the movement of user or node into a new IP subnetwork. The movement of nodes to a new subnetwork requires that a new route for IP packets be established for sending to the destination node. Multicast approaches with support in Mobile IP have been proposed. For example. the bi-directional tunneling solution for Mobile IP puts the burden of forwarding the multicast packets to mobile users on the Home Agent (HA). However, when an HA has a number of users in the same multicast group visiting the same foreign network, tunneling multiple multicast packets to the foreign network is inefficient. To avoid the duplication of multicast packets, remote subscription has been proposed whereby a user desiring to join a multicast group will do so in each visited network through a Foreign Agent (FA). However, this requires that after every handoff the user must rejoin a multicast group. In addition, the multicast trees used to route multicast packets will be updated after every handoff to track multicast group membership. To limit tree updates and duplication of multicast packets, proxies or agent-based solutions have also been proposed.

The known multicast solutions rely on knowledge and control of the network routers to perform multicast routing. However, since multicasting capabilities are not ubiquitous, tunneling techniques have been proposed to route IP multicast packets to stationary users across non-multicast-enabled networks. For example, Automatic Multicast Tunneling (AMT) uses an encapsulation interface that takes multicast IP packets and encapsulates them in unicast packets to traverse over non-multicast capable networks. Similarly, UDP Multicast Tunneling Protocol (UMTP) encapsulates UDP multicast packets and tunnels them through non-multicast capable networks.

There remains a need in the art for improvements in the field of multicasting, particularly for mobile users in diverse networks.

SUMMARY

Service providers require the ability to efficiently multicast to mobile users through various networks. From the service provider's point of view, this requires some understanding of the multicasting capabilities in the various access networks over which service is provided. In most cases, the service provider will have limited knowledge and control over the backbone and/or the access networks. In addition, the service provider must be able to track the location of the mobile users in order to update and maintain location-based services. For example, in each new local area, the multicast group membership may change to reflect a different filter for the appropriate location-specific information.

The present invention provides an infrastructure to evolve with the multicast capabilities of the network based on application-layer multicast and tunneling techniques. The architecture of the present invention supports user mobility across access networks with varying multicast capabilities. Further, additional elements are introduced in the backbone and access networks to identify and tailor multicast services to users based on the location and access network information.

DETAILED DESCRIPTION OF THE DRAWINGS

The application-layer multicast architecture of the present invention allows a service provider to efficiently multicast information from a media server, acting as the information source and located in the backbone network, to the user roaming across different access networks. The application-layer architecture of the present invention was designed with the following considerations in mind.

Consideration 1: User mobility during multicast. As a user moves among networks of different capabilities the architecture must maintain multicast sessions and if needed, update geographical information for location-specific needs. The application-layer solution needs to be able to handle handoff between dissimilar multicast-capable access networks. Further, the solution needs to take advantage of known information about the access and backbone networks to properly configure user devices and other application-layer elements to use multicast techniques. A minimum level of information required from the network provider in order for the service provider to understand the multicasting capability in the network must also be established.

Consideration 2: Multicasting for location-specific services. The multicast solution needs to derive location information based on advertised information about the access network or user's local area. Further, the architecture must be flexible enough to handle various location-based filtering mechanisms. For efficiency, the point in the network where multicast services will be tailored for the user should be near the mobile user. This is especially true if users are highly mobile and location-related updates will be quickly outdated when communicating with remote network elements.

Consideration 3: Multicast address management. A method of handling addressing when there may be many multicast groups must also be provided. This is especially true if there are many location-based services and different multicast addresses are used for each local area. If unique multicast addresses are required, then a dynamic scheme for supporting specific multicast services must be developed.

By providing the solution of the present invention as an application-layer solution, the above goals are supported and a flexible architecture is achieved. In particular, the application-layer solution allows third-party service providers to support multicast services across access and backbone networks with incompatible multicast capabilities. The multicast architecture of the present invention overlays on the existing backbone and access network but takes advantage of underlying multicast capabilities when possible. In addition, the architecture of the present invention requires only limited control and knowledge of the underlying capabilities of the access and backbone networks.

Figure 1:
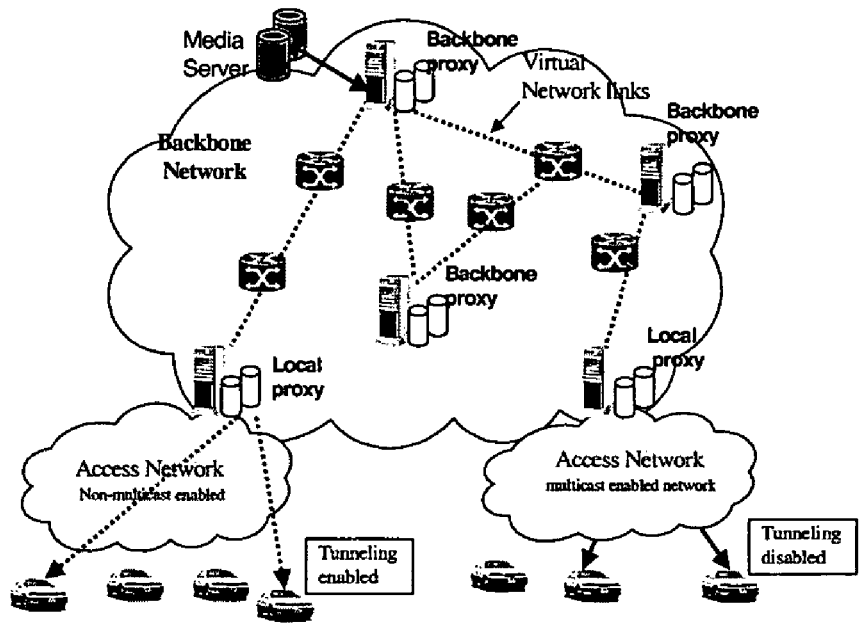
FIG. 1 depicts architecture according to one embodiment of the present invention.

In accordance with the present invention, multicast proxies are established in the backbone network and at the edges of the access networks. These proxies relay information from the media server to the users across diverse networks. The proxies along with the user devices will form virtual networks that will be under the full control of the service provider. FIG. 1 depicts the virtual network created by the architecture of the present invention and comprises three types of entities; the backbone proxies, the local proxies and the user devices.

The backbone proxies form the virtual network using tunnels (e.g., UMTP) between neighboring backbone proxies. In addition, these proxies can communicate with the media servers and act as gateways to the mobile users. The virtual network of proxies can be pre-configured since these nodes are fully controlled by the service provider. The topology and tunneling among the backbone proxies are relatively fixed but can be updated periodically as proxies are removed or added into the network. In addition, the backbone proxies can be made knowledgeable of the multicasting capability in its part of the network from utilizing basic information about the surrounding network supplied by a network provider.

One function of the backbone proxy is to intercept multicast packets from the media server. These multicast packets are then forwarded along the multicast route as determined by the multicast IP address and routing tables. The multicast packets can also be tunneled across non-multicast capable networks to the next-hop backbone proxy in order to reach the mobile user. The next-hop proxy is determined from the virtual network routing information. For different multicast groups, the virtual network can be used to form different virtual multicast trees, which will efficiently route tunneled multicast packets through the backbone network.

Nodes, or local proxies are located at the edge of the access network to act as local multicast proxies within the access network. The local area that the local multicast proxy manages may consist of one or more access networks depending on the geographical coverage of the access networks. The local proxies will join the virtual network of backbone proxies. They will advertise their multicast services to users in the local area and identify the appropriate multicast groups to join, if desired. Service requests from the user are intercepted by the local proxies that will also act as a gateway for the user to reach servers in the backbone networks. In addition, the local proxy will determine the multicast capabilities of the access networks and tunnel through the access network to the user if the lower network layers are not multicast-enabled.

Local proxies may also support other functions. For example, the local proxies can be utilized to provide seamless handoff of mobile users traversing access networks while in a multicast session. For non-location specific applications, this is accomplished by allowing users to maintain the same multicast address even though a user's IP address may change. For location-based information, handoff between the current local proxies and the target local proxies may be supported using soft handoff techniques which will allow users to maintain services while local proxies update location-based information.

The user device, typically located within a moving vehicle, will have the capability of joining specific multicast groups through the local proxy using IGMP or RTCP. It will receive IP multicast packets or tunneled multicast packets from the local proxy while in the area managed by that local proxy. The user devices may utilize a number of tunneling techniques to handle multicast packets received in a non-multicast-capable access network. Thus, the user devices will have the capability of switching the tunneling on and off as required as they traverse various access network types. The tunneling is triggered by the capability of the access network, as advertised by the local proxy.

The multicast architecture of the present invention is capable of using IP multicast when available. However, general multicast requires that unique multicast IP addresses must be used to identify a multicast group. This requires negotiation with a global multicast address allocation server to determine unique multicast addresses for each multicast service. This is even more difficult if unique multicast addresses are needed for each local area for the purposes of location-based services.

Therefore, in order to manage multiple groups for multicast services, the present invention uses the Source Specific Multicast scheme which identifies a multicast group by both the source IP address and the IP multicast address. The source IP address is provided by the media server supporting the service. A backbone proxy can be selected to assign IP multicast addresses for multicast services in local areas. Both TTL-scoped and administratively-scoped multicast address management may be used to minimize the multicast address management overhead required for assigning unique multicast addresses to each multicast group in each local area.

A user's multicast group membership may change for each coverage area depending on the multicast service provided. For example, for location-specific applications, it is more likely that there will be many distinct multicast groups, i.e. one for each local area. For local information, such as traffic conditions and advertisements, a common multicast address may be used in every coverage area, but the server address may be different in order to provide the correct local information for the coverage area. On the other hand, video multicast may be identified by the same server and multicast address in a number of adjacent local areas since this information may not be filtered to be location-specific.

Figure 2:
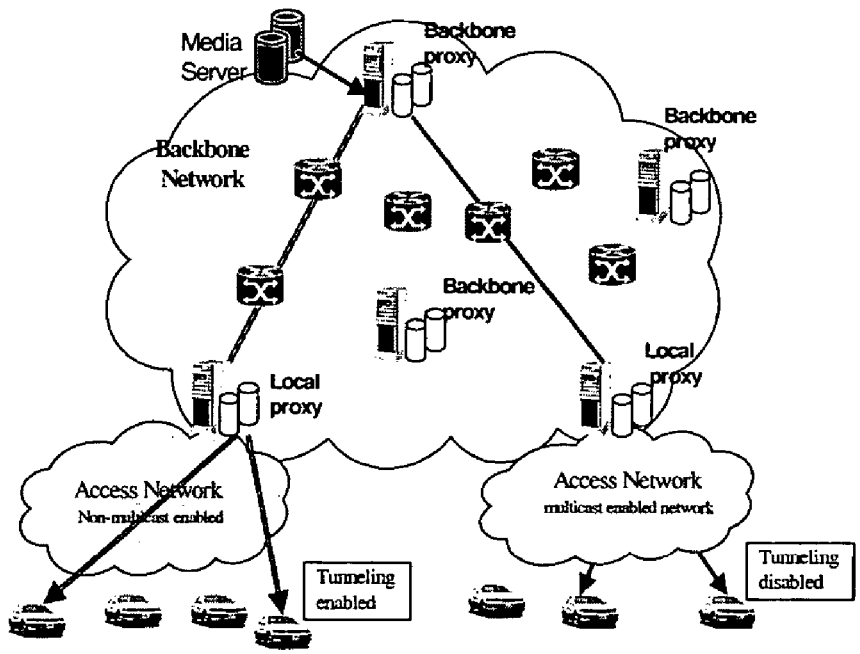
FIG. 2 depicts architecture according to another embodiment of the present invention.

FIG. 2 depicts architecture in accordance with the present invention in which different scenarios are shown. In particular, the users in both access networks desire certain services from the media server. The users contact their local proxies that then forward the user request to the backbone proxy. Part of the local proxy's request may be to join the multicast group or create a virtual route from the backbone proxy to the local proxy. On the right side of the network shown in FIG. 2, a first scenario is depicted, wherein the multicast capabilities are enabled in the backbone and in the access network. As a result, the multicast packets can be sent without interference by either the local or backbone proxies since the underlying IP multicasting will handle the multicast routing.

In contrast, for the path on the left side of FIG. 2, a scenario is shown wherein the backbone network has no multicast capability so packets are tunneled across the virtual links to the local proxy. The virtual links chosen in the backbone establish a multicast tree for efficient distribution to local proxies whose users require the same service. The virtual route to the various local proxies can be quickly determined from the topology tables already pre-configured in the backbone proxies. In addition, since the access network is not multicast capable, the local proxies tunnel the packets to the mobile users. The user device will then decapsulate the packets and process the multicast packets that are enclosed.

An example of a message flow for a user joining a multicast group through the local proxy in the architecture according to the present invention can be described as follows. The user joins the multicast group, either locally or globally defined, as advertised by the local proxy based on the information supplied by the service provider. The local proxy may or may not be part of the multicast group. However, the local proxy advertises all services it can potentially support and only joins multicast groups based on the subscription to the specific services by users in its local area. If the local proxy is not already part of the multicast group being requested by the user, it will forward a JOIN to the backbone proxies. The backbone proxies then send packets to the local proxies using tunneling or native IP multicasting. In turn, the local proxies will send packets to the user using native IP multicasting, or tunneling if the access network does not support multicast. The tunneling will be triggered in the user device to properly decapsulate tunneled multicast packets.

Mobile users will be traversing various access networks while maintaining multicast sessions resulting in the need for mobility updates, i.e. IP address changes that are controlled by the network carrier. The service providers need to be able to quickly react to handoffs in order to update multicast group membership or maintain location-based multicast streams. By using the multicast architecture of the present invention, handoff between networks with similar capabilities, e.g. between two multicast-enabled networks, as well as between networks with dissimilar multicast capabilities, e.g. between multicast and non-multicast-enabled access networks is enabled. For example, a user may be in a multicast session via a tunneling setup (e.g. UMTP) in a non-multicast-enabled network. When the user then travels toward another network that is multicast-enabled, the proxies in the backbone and the access networks can negotiate among themselves to handle soft handoff of the user into the new access network while maintaining the multicast service. That is, the local proxies can join the multicast group proactively for a mobile user soon to enter its local area.

One scenario has the source local proxy located in a multicast-enabled access network and the target local proxy situated on the edge of a non-multicast-enabled access network. For simplicity of explanation, it is assumed that the backbone network is multicast-capable. In addition, it is assumed that there are other users in the same multicast group in the initial access network or local area but not in the target local area. A sample message flow for this scenario is described as follows. Initially, the user is in a multicast-enabled access network and therefore, the local proxy is part of the IP multicast tree and is not tunneling packets to the user. When the user moves into a new access network, it leaves the previous multicast user group and it can begin listening for possible services and tunneling options in the target access network. The user will make a request to join the desired multicast group via the target local proxy. Based on the service requested by the user, the local proxy will join the multicast group, if it is not part of it already, and then advertise the tunneling technique to the user because the target access network does not have multicast capability. The backbone proxy will then forward the multicast packets to the target local proxy which will send the packet via tunneling to the user.

If a user is to be provided location-specific information, the user's geographical location must also be known by either the media server that is streaming information to the user and/or by the local proxy that is filtering the information to the user. The multicast group may be updated in each area to reflect the new location, either through the multicast address, or source address, if using SSM. There are several ways to determine the user's location. One method is to use GPS technology in the user device, whereby the GPS information is communicated to the media server or local proxies that would filter the appropriate content e.g. the local news and traffic information, accordingly.

As networks slowly migrate to full multicast deployment, there will continue to be backbone and access networks which are not multicast-enabled. The application-layer multicast solution of the present invention takes advantage of multicast capabilities at lower network layers while still supporting multicast across non-multicast-enabled networks. In addition, the architecture of the present invention supports multicast service continuity to mobile users.

The architecture of the present invention uses virtual networks and multicasting proxies to handle multicasting to mobile users over diverse networks. A virtual network of proxies is created to take advantage of various levels of multicasting capability in the physical network. By having the multicast in the application layer, dependency on IP multicast is avoided and rather tunneling is used to route multicast packets across networks without IP multicast. In addition, the local proxies are used to advertise access network multicast capabilities and dynamically trigger tunnel creation to user devices in access networks which are not multicast-enabled. The local proxies can also act as filters for localized information and support location-based services to mobile users.

It is anticipated that other embodiments and variations of the present invention will become readily apparent to the skilled artisan in the light of the foregoing description and examples, and it is intended that such embodiments and variations likewise be included within the scope of the invention as set out in the appended claims.

What is claimed is:

1. A telecommunications network for providing multicast services for distributing content to mobile users, said mobile users moving between a plurality of access networks, said telecommunications network comprising:
    at least one media server for providing content;
    a virtual network of backbone proxies that communicate with said media server and acting as a gateway between said media server and said mobile users; and
    local proxies that communicate with said backbone proxies and act as a gateway between said mobile users and said backbone proxies, said local proxies are located at the edge of the access networks and a backbone network, wherein end-to-end communication between said at least one media server and said mobile users is controlled at an application layer.

2. A telecommunications network according to claim 1, wherein said backbone proxies communicate between each other by means of a tunneling technique.

3. A telecommunications network according to claim 2, wherein said tunneling technique is automatic multicast tunneling.

4. A telecommunications network according to claim 2, wherein said tunneling technique is UDP multicast tunneling protocol.

5. A telecommunications network according to claim 1, wherein said backbone proxies intercept multicast packets sent by said media server and forwards said packets along a multicast route in said virtual network.

6. A telecommunications network according to claim 5, wherein said multicast route is pre-configured.

7. A telecommunications network according to claim 1, wherein said local proxies advertise multicast services to said mobile users.

8. A telecommunications network according to claim 1, wherein said local proxies intercept service requests from said mobile users and route said requests to said media servers through said virtual network.

9. A telecommunications network according to claim 1, wherein said access network is not multicast-enabled and said local proxies provide multicast information to said mobile users using a tunneling technique.

10. A telecommunications network according to claim 1, wherein said network utilizes IP multicast when available.

11. A telecommunications network according to claim 1, wherein a multicast group is identified by both a source IP address provided by said media server and an IP multicast address assigned by said backbone proxies.

12. A telecommunications network according to claim 1, wherein said media server provides location-specific information and the mobile users geographical location is determined by GPS technology.

13. A method for a mobile user to join a multicast group, said mobile users moving between a plurality of access networks, said method comprising:
    establishing a telecommunications network for providing multicast services for distributing content to mobile users comprising at least one media server for providing content, a virtual network of backbone proxies that communicate with said media server and acting as a gateway between said media server and said mobile user, and local proxies that communicate with said backbone proxies and act as a gateway between said mobile user and said backbone proxies, said local proxies are located at the edge of the access networks and a backbone network, said method comprising:
    said local proxies advertising said content provided by said media server;
    said mobile user sending a request for said content;
    said local proxies receiving said request and forwarding said request to said media server through said virtual network;
    said media server sending said content to said local proxies through said virtual network; and
    said local proxies sending said content to said mobile users, wherein end-to-end communication between said at least one media server and said mobile users is controlled at an application layer.

14. A method according to claim 13, wherein said local proxies use a tunneling technique to send said content to said mobile users.

15. A method according to claim 13, wherein said plurality of access networks is selected from a group consisting of non-multicast enabled networks and multicast enabled networks.

16. A method according to claim 15, wherein at least one of each plurality of access networks is a non-multicast enabled network.

* * * * *